United States Patent
Gunnarsson et al.

(10) Patent No.: US 9,810,548 B2
(45) Date of Patent: Nov. 7, 2017

(54) BAROMETRIC CALIBRATION OF USER EQUIPMENT

(71) Applicant: Telefonaktiebolaget L M Ericsson (publ), Stockholm (SE)

(72) Inventors: Fredrik Gunnarsson, Linköping (SE); Henrik Revsbech Dam, Copenhagen (DK); Javier Muñoz Martin, Malaga (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 78 days.

(21) Appl. No.: 14/893,472

(22) PCT Filed: Jun. 17, 2013

(86) PCT No.: PCT/EP2013/062502
§ 371 (c)(1),
(2) Date: Nov. 23, 2015

(87) PCT Pub. No.: WO2014/202111
PCT Pub. Date: Dec. 24, 2014

(65) Prior Publication Data
US 2016/0109259 A1   Apr. 21, 2016

(51) Int. Cl.
*G01C 5/06* (2006.01)
*G01C 25/00* (2006.01)
*H04W 4/02* (2009.01)

(52) U.S. Cl.
CPC ............. *G01C 25/00* (2013.01); *G01C 5/06* (2013.01); *H04W 4/02* (2013.01)

(58) Field of Classification Search
CPC ...................................................... G01C 5/06
See application file for complete search history.

(56) References Cited

U.S. PATENT DOCUMENTS

| | | | |
|---|---|---|---|
| 6,518,918 | B1 | 2/2003 | Vannucci et al. |
| 6,728,552 | B2 | 4/2004 | Chatain |
| 7,162,368 | B2 | 1/2007 | Levi et al. |
| 7,676,232 | B2 | 3/2010 | Wigren et al. |
| 2001/0004603 | A1 | 6/2001 | Heikkinen et al. |

FOREIGN PATENT DOCUMENTS

| | | |
|---|---|---|
| EP | 1 115 241 A2 | 7/2001 |

OTHER PUBLICATIONS

International Search Report, Application No. PCT/EP2013/062502, dated Aug. 21, 2014.
Written Opinion of the International Searching Authority, Application No. PCT/EP2013/062502, dated Aug. 21, 2014.
3GPP, Technical Report, "3rd Generation Partnership Project; Technical Specification Group Radio Access Network; Study on Minimization of drive-tests in Next Generation Networks (Release 9)", 3GPP TR 36.805 V9.0.0 (Dec. 2009), 24 pp.

(Continued)

*Primary Examiner* — Robert R Raevis
(74) *Attorney, Agent, or Firm* — Sage Patent Group

(57) ABSTRACT

Techniques of barometric calibration of altitude determination by user equipments in a mobile communications network are discussed. In various embodiments, for a plurality of the user equipments, at least one subset of the user equipments is established. Barometric calibration data is determined for the established at least one subset and sent to the user equipments.

14 Claims, 9 Drawing Sheets

(56) References Cited

OTHER PUBLICATIONS

ETSI, Technical Specification, "LTE Evolved Universal Terrestrial Radio Access (E-UTRA); Physical layer—Measurements (3GPP TS 36.214 version 9.1.0 Release 9)", ETSI TS 136 214 V9.1.0 (Apr. 2010), 15 pp.

ETSI, Technical Specification, "LTE; Evolved Universal Terrestrial Radio Access Network (E-UTRAN); Stage 2 functional specification of User Equipment (UE) positioning in E-UTRAN (3GPP TS 36.305 version 9.2.0 Release 9)", ETSI TS 136 305 V9.2.0 (Apr. 2010), 54 pp.

ETSI, Technical Specification, "LTE; Evolved Universal Terrestrial Radio Access (E-UTRA); Radio Resource Control (RRC); Protocol specification (3GPP TS 36.331 version 9.2.0 Release 9)", ETSI TS 136 331 V9.2.0 (Apr. 2010), 252 pp.

BAROMETRIC CALIBRATION OF USER EQUIPMENT

CROSS REFERENCE TO RELATED APPLICATION

This application is a 35 U.S.C. §371 national stage application of PCT International Application No. PCT/EP2013/062502, filed on Jun. 17, 2013, the disclosure and content of which is incorporated by reference herein in its entirety. The above-referenced PCT International Application was published in the English language as International Publication No. WO 2014/202111 A1 on Dec. 24, 2014.

TECHNICAL FIELD

The present invention relates to a method of providing barometric calibration data, to a network node configured to provide barometric calibration data, to a method of determining an altitude of an user equipment, and to an user equipment.

BACKGROUND

Techniques are known which provide geo-localization of a user equipment (UE) in a mobile communications network. The UE is typically portable and establishes data communication with an access node of the mobile communications network via a radio link. Therefore, the UE typically exhibits a time-varying position which needs to be determined from time to time.

The position of the UE is often defined with respect to a location and/or an altitude. The location can be defined as, e.g., geographical latitude and longitude. The altitude can be defined as, e.g., elevation with respect to sea level or elevation with respect to a reference coordinate system or a geoid, e.g., as specified by the World Geodetic System (WGS) 1984, or elevation with respect to any other reference altitude.

Various techniques are known which allow determining the location and altitude. For example, positioning by means of one or more Global Navigation Satellite Systems (GNSSs) is known. GNSSs include the Global Positioning System (GPS) and the Galileo System. A further technique of determining the position of the UE is the Observed Time Difference of Arrival (OTDOA) method. This method utilizes the differences of time measurements of downlink radio signals from a plurality of access nodes of the mobile communications network, e.g., along with knowledge of the location of the access nodes and/or their relative downlink timing. Yet a further technique of determining the position of the UE is a so-called cell identification positioning technique. Here reference signals transmitted via the radio link of the mobile communications network can be employed together with knowledge of the location of a respective access node.

Yet, such techniques face certain restrictions. Typically, an accuracy when determining the altitude of the UE is limited; in particular, error margins for the determined altitude may be significantly larger than for the determined location. For example, the accuracy of the determined altitude may be in the order of tens of meters or more—while, in comparison, the accuracy of the determined location may be in the order of one or two meters. Such limited accuracies of the determined altitude can be insufficient for various applications, including, but not limited to floor-level navigation in a high-rise building.

In this regard, it is known to perform barometric pressure measurements at the UE, e.g., from EP 1 154 231 A1 and US 2002 090 976 A1. Barometric calibration data is provided by an access node to the UE. Based on the barometric calibration data, the UE can determine its altitude, preferably with a higher accuracy.

Yet, also these techniques face certain restrictions. Due to the large number of UEs, scenarios can occur where the work-load imposed on the access node is comparably high. Further, it may be necessary to perform reference measurements, e.g., at an access node, and/or to access an external database in order to provide the barometric calibration data. E.g., the reference measurements may be subject to failure, offsets, and generally may need to be supervised. As a further example, the access to an external database, e.g., from a weather data provider, may be subject to failure as well. Further, the data of the database may be limited in accuracy. All this may increase system complexity and a likelihood of system failure.

Accordingly, there is a need for techniques which allow for providing advanced techniques for determining the altitude of a UE. In particular, a need exists for such techniques which allow for an accurate determining of the altitude. Furthermore, a need exists for such techniques which allow determining the altitude with limited computational resources. Furthermore, a need exists for such techniques with limited system complexity and low likelihood of system failure.

SUMMARY

This need is met by the features of the independent claims. The dependent claims defined further embodiments.

According to an aspect, a method of providing barometric calibration data to a given UE in a mobile communications network is provided. The method comprises a network node receiving a respective calibration request from each one of a plurality of UEs. The plurality of UEs includes the given UE. The method further comprises establishing at least one subset of the plurality of UEs which includes the given UE. The method further comprises determining the barometric calibration data for the established at least one subset and sending the barometric calibration data at least to the given UE.

According to a further aspect, a network node of a mobile communications network is provided. The network node is configured to provide barometric calibration data to a given UE of the mobile communications network. The network node comprises an interface configured to receive a respective calibration request from each one of a plurality of UEs. The plurality of UEs includes the given UE. The network node comprises at least one processor which is configured to establish at least one subset of the plurality of UEs which includes the given UE. The at least one processor is further configured to determine the barometric calibration data for the established at least one subset. The interface is further configured to send the barometric calibration data at least to the given UE.

According to a further aspect, a method of determining an altitude of a UE in a mobile communications network is provided. The method comprises receiving a first part of barometric calibration data. The method further comprises, based on the received first part of the barometric calibration data, measuring and/or adjusting a barometric pressure value using a barometric pressure sensor. The method further comprises receiving a second part of the barometric calibration data. The method further comprises, in dependence of the second part of the barometric calibration data and/or in dependence of the measured barometric pressure value, determining an altitude of the UE.

According to a further aspect, a UE in a mobile communications network is provided. The UE comprises an interface which is configured to receive a first part of a barometric calibration data. The UE further comprises a barometric pressure sensor configured to measure and/or adjust a barometric pressure value based on the received first part of the barometric calibration data. The interface is further configured to receive a second part of the barometric calibration data. The at least one processor is further configured to determine an altitude of the UE in dependence of the second part of the barometric calibration data and/or in dependence of the measured barometric pressure value.

According to a further aspect, a method of providing barometric calibration data to a given UE in a mobile communications network is provided. The method comprises, in response to an access node of the mobile communication network establishing a connection with the given UE, sending a predefined reference altitude to the given UE.

According to a further aspect, a network node of a mobile communications network is provided. The network node is configured to provide barometric calibration data to a given UE. The network node comprises an interface which is configured to send a predefined reference altitude to the given UE, in response to an access node of the mobile communications network establishing a connection with the given UE.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION OF EMBODIMENTS

Figure 1:
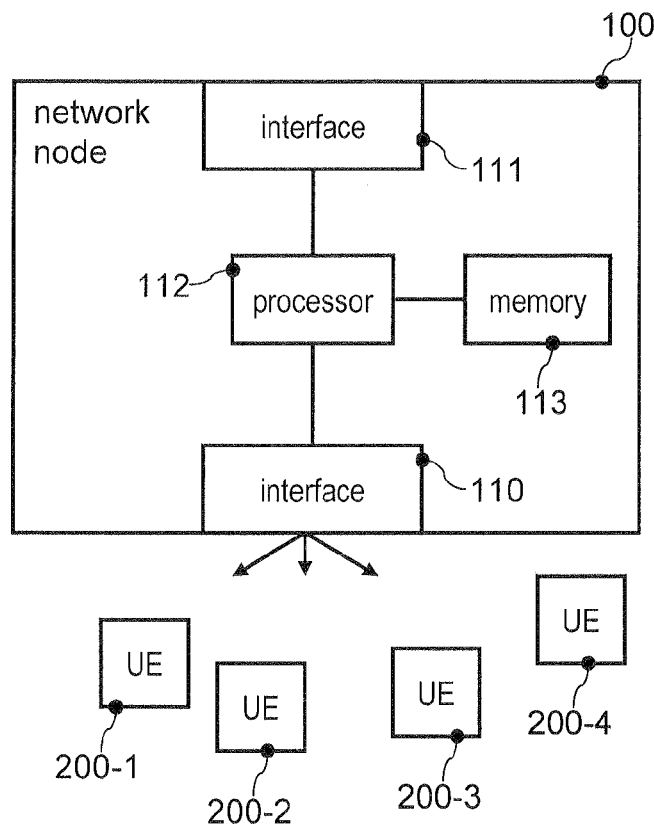
FIG. 1 schematically illustrates a network node according to various embodiments.

In the following, the invention will be explained in greater detail by referring to exemplary embodiments and to the accompanying drawings. The illustrated embodiments relate to concepts of providing barometric calibration data and of determining an altitude of a UE in a mobile communications network. In particular, various embodiments rely on establishing subsets which include UEs.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various kinds of mobile communications systems are known, e.g., as specified by 3rd Generation Partnership Project (3GPP). In the illustrated embodiments, the mobile communications network implements a 3GPP cellular radio access technology. However, it is to be understood that these concepts could also be implemented in other types of telecommunications network.

In FIG. 1, a network node 100 of the mobile communications network is illustrated. For example, the network node 100 can be an access node which establishes a radio link with the UE. For example, the network node 100 can be according to the 3GPP Long Term Evolution (LTE) standard, then referred to as evolved Universal Mobile Telecommunications System Terrestrial Radio Access Network (E-UTRAN) Node B (eNB). However, the network node 100 does not necessarily need to be an access node. In general, the network node 100 can be any other entity of the mobile communications network.

The network node 100 comprises a processor 112. For example, the processor 112 can be a single core processor or a multi core processor. The processor 112 can have various tasks assigned thereto, including, but not limited to: establishing a subset which includes UEs and determining the barometric calibration data. The processor 112 has access to a memory 113. It would also be possible that the memory or parts thereof are externally provided, i.e., by granting the processor 112 remote access. The memory 113 can store, e.g., a reference altitude, a barometric pressure and/or an altitude associated with a UE, criterions which define a subset, and/or barometric pressure sensor error compensation data, etc.

Further, in the scenario of FIG. 1, the network node 100 comprises an interface 110 which is configured to establish a connection via a radio link with one or more UEs 200-1-200-4, e.g., via the radio link. The network node 100 in FIG.

2 comprises a further interface 111. The further interface 111 can be configured to establish a data connection with a weather data provider to obtain weather data and/or barometric calibration data such as temperature and/or reference pressure, etc.

It should be understood that in general there is no need to provide the particular interfaces 110, 111 as illustrated in FIG. 1. Rather, an indirect data connection with the UEs 200-1-200-4 may be established, e.g., via an intermediate access node.

Figure 2:
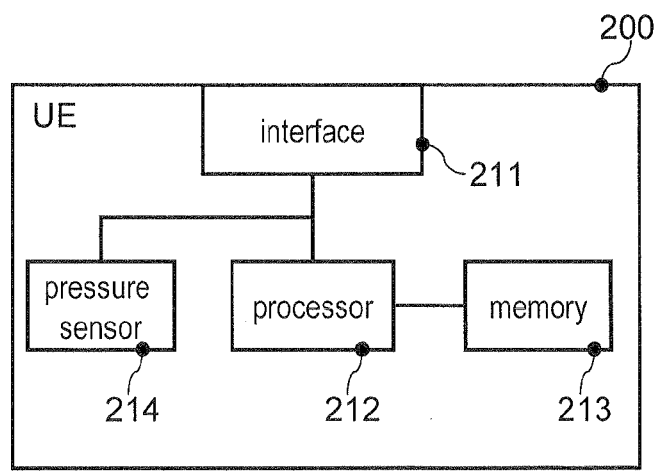
FIG. 2 schematically illustrates a UE according to various embodiments.

In FIG. 2, a UE 200 is shown in greater detail. The UE 200 comprises an interface 211 which is configured to establish a connection with an access node of the mobile communications network via the radio link. By such means, the UE 200 can communicate with the network node 100 (cf. FIG. 1). Further, the UE 200 comprises a processor 212, e.g., a multi-core or single-core processor. The processor 212 has access to a memory 213.

The UE 200 further comprises a barometric pressure sensor 214. The barometric pressure sensor 214 is configured to measure an ambient barometric pressure value, e.g., when instructed to do so or at a given repetition rate. E.g., the barometric pressure value may be in mbar or hPa or any other suited unit. Here, measuring corresponds to acquiring of the data and optionally adjusting the data, e.g., by compensating for drifts or offsets. The acquiring and the adjusting can be generally executed with a time offset or in immediate succession.

The barometric pressure sensor 214 may be mounted in the UE 200 such that it is in fluid connection with the outside of the UE 200. Various reference implementations of the barometric pressure sensor 214 are known to the skilled person, e.g., based on a micro-electro-mechanical system (MEMS) or piezoresistive silicon-based system, or the like. For example, the barometric pressure sensor 214 can be temperature-compensated. In a simple embodiment, the barometric pressure sensor 214 provides an analogue output signal having a level which is indicative of the pressure which can be read out, e.g., by the processor 212. It is also possible that the barometric pressure sensor 214 provides a digital signal which includes indicators which indicate the barometric pressure; the digital signal can be read out by the processor 212. In general, various types of the barometric pressure sensor 214 can be implemented according to various embodiments. The various types of the barometric pressure sensor 214 can have different operation characteristics such as: accuracy, temperature stability, response time, drift, and/or pressure range, etc. These operation characteristics can show a time-dependency, i.e. a drift, at may constitute a systematic and/or statistical error source, thereby increasing error margins of the measured barometric pressure.

Figure 3:
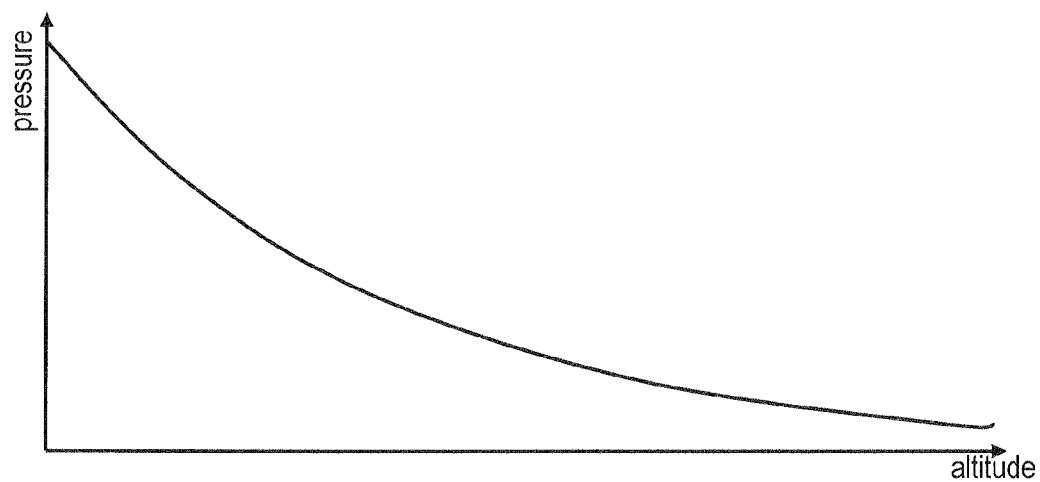
FIG. 3 illustrates a dependency of pressure on altitude.

The processor 212 of the UE 200 can be configured to calculate an altitude of the UE 200 based on the measured barometric pressure value. This can be done, e.g., by employing the so-called barometric formula. Here the altitude h is given by:

$$h = \ln\left(\frac{P_b}{P}\right)\frac{R^* T_b}{M g_0} + h_b, \quad (1)$$

where $P_b$ is the barometric pressure at a reference altitude (reference barometric pressure), $T_b$ is a reference temperature, $h_b$ is the reference altitude, $g_0$ is the gravitation acceleration, M is the molar mass of the air, and $R^*$ is the universal gas constant. The underlying exponential dependency of the pressure on the altitude is illustrated in FIG. 3. If the reference barometric pressure and the reference altitude are known, it is possible to determine the altitude based on the measured pressure.

In general, other types of dependencies than the one as described by Eq. 1 may be used to determine the altitude based on the barometric pressure value. For example, more accurate or more simplified models may be employed.

Figure 4:
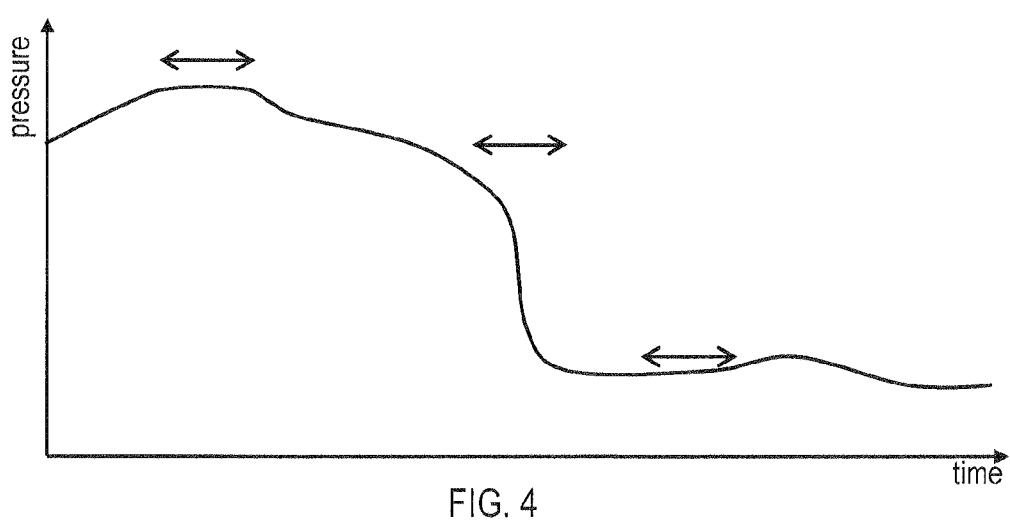
FIG. 4 illustrates a dependency of pressure on time.
Figure 5:
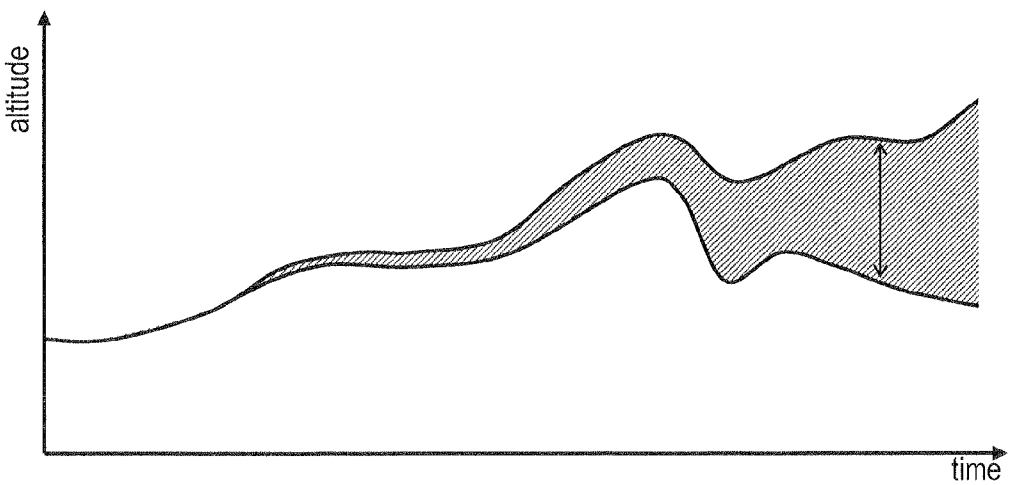
FIG. 5 illustrates a dependency of altitude, as well as an altitude confidence value, the altitude being determined based on the pressure on time.

The pressure typically changes over time—even at a fixed position and altitude. An illustrative time-dependency of the pressure is shown in FIG. 4 for a fixed position. As can be seen from FIG. 4, there is typically a characteristic time-scale over which the pressure can be assumed to be roughly constant (illustrated by the horizontal arrows in FIG. 4). After the duration of such a time-scale, it may be desired to re-calibrate the system by newly obtaining a correct value pair of the reference barometric pressure and the reference altitude (see Eq. 1). Otherwise, the uncertainty in the determined altitude may increase over time as depicted in FIG. 5 by the dashed area. As can be seen from FIG. 5, at some point—without barometric re-calibration—error margins of the determined altitude become significant. Such measurements may be unreliable and, therefore, of limited use.

There are various underlying reasons for the increasing uncertainty in the determined altitude progress in time. Some examples are given, which do not necessarily need to be concluding. First, due to changing weather conditions the reference pressure may change. Weather changing from high-pressure to low-pressure may cause a drift in the reference pressure. Such an error source is predominantly due to external influences. Second, an accuracy of the barometric pressure sensor may decrease over time. This is sometimes referred to as the barometric pressure sensor may become detuned. A statistical and/or systematic error of the measured barometric pressure value may increase over time. Such an error source is predominantly due to device-inherent internal reasons.

Hereinafter, techniques are described which provide for such a barometric calibration as mentioned above. The techniques allow addressing various kinds of sources for increased uncertainty in the pressure measurements.

Figure 6:
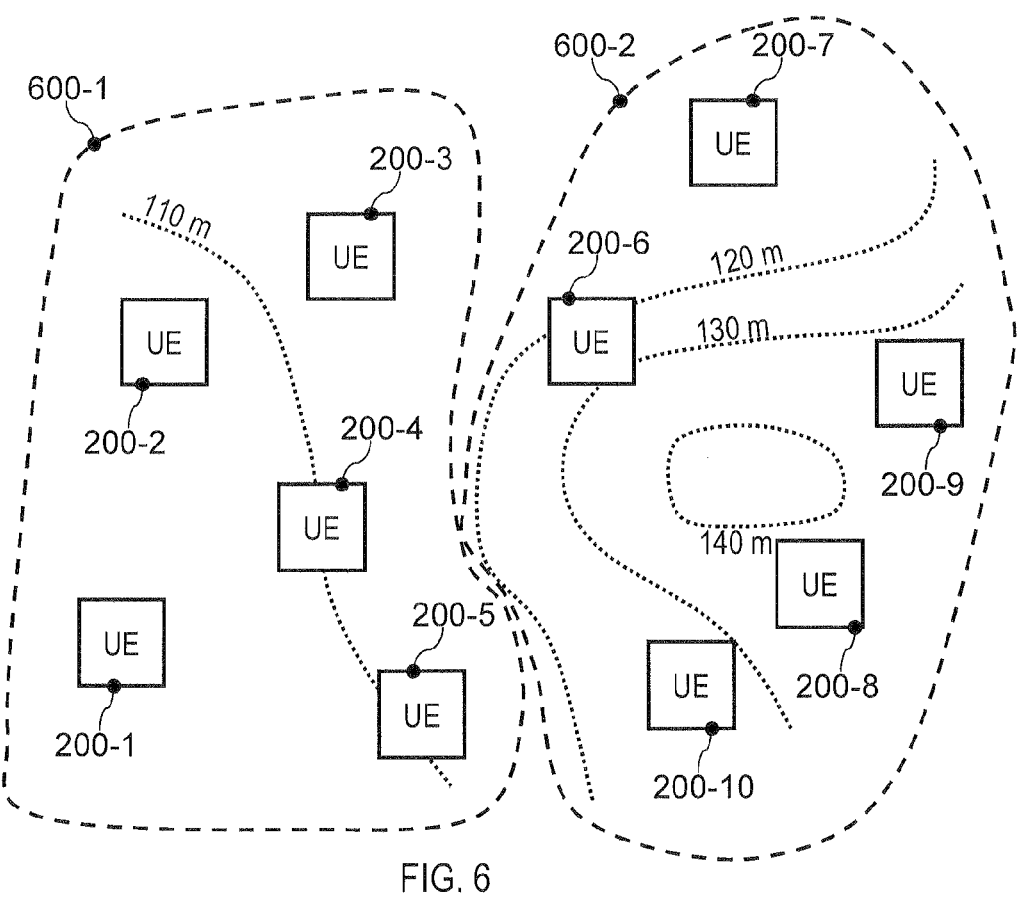
FIG. 6 illustrates two subsets including UEs according to various embodiments.

In FIG. 6, a plurality of UEs 200-1-200-10 is shown. The UEs 200-1-200-10 are distributed over a certain terrain. Dotted contour lines illustrate an altitude variation of the terrain. The UEs 200-1-200-10 are grouped with respect to two subsets 600-1, 600-2 (illustrated by dashed lines in FIG. 6). In FIG. 6, the subsets 600-1, 600-2 are defined with respect to the locations of the UEs 200-1-200-10. A first subset 600-1 includes all UEs 200-1-200-5 which have locations depicted on the left-hand side of FIG. 6 and a second subset 600-2 includes all UEs 200-6-200-10 which have locations depicted on the right-hand side of FIG. 6. As can be seen from FIG. 6, the altitude variation of the terrain covered by the subsets 600-1, 600-2 amounts to roughly ±20 m and can therefore be considered to be limited in various applications.

In general, it is possible that different criterions are relied upon for the establishment of the subsets 600-1, 600-2. Various criterions can also be combined. Such criterions can be selected from the group comprising: sensor type of the barometric pressure sensor 214 of the UEs 200-1-200-10, the location of the UEs 200-1-200-10, the position of the UEs 200-1-200-10, the altitude of the UEs 200-1-200-10, a number of UEs included in the respective subset 600-1, 600-2; a size of an area covered by the respective subset 600-1, 600-2; an altitude variation of the area covered by the respective subset 600-1, 600-2; a temperature and/or temperature variation measured by the respective UEs 200-1-200-10 within the area covered by the respective subset 600-1, 600-2, etc. For example, the subsets 600-1, 600-2 can be established by including the UEs 200-1-200-10 which have corresponding sensor type information of their respective barometric pressure sensor 214. Another example could be that the at least one subset 600-1, 600-2 is established by including the UEs 200-1-200-10 which are located within a predefined proximity with respect to each other. For example, it is possible to have more than one subset 600-1, 600-2 per UE 200-1-200-10, i.e., include one and the same UE 200-1-200-10 in more than a single subset 600-1, 600-2. In other words, the subsets 600-1, 600-2 may be overlapping. For example, the network node 100 can be configured to establish a first subset 600-1, 600-2 in dependence of the sensor type information, and to establish a second subset in dependence of a location of the UEs 200-1-200-10. Both, the first and second subsets 600-1, 600-2 can include the same UE 200-1-200-10.

As will be explained in further detail below, the subsets 600-1, 600-2 are employed to provide barometric calibration data to the UEs 200-1-200-10 within each subset 600-1, 600-2. In this regard, the network node 100 is configured to receive a calibration request from a given UE 200-1-200-10 and establish at least one subset 600-1, 600-2 which includes the given UE 200-1-200-10.

Establishing the subset can take various forms. For example, a set of predefined subsets 600-1, 600-2 may exist, i.e., predefined criterions specifying each one of the set of subsets 600-1, 600-2 may be available to the network node 100. For example, the set may be stored on the memory 113 or may be obtained from another network entity. Then, upon receiving the calibration request, the network node 100 checks the criterions of which subsets 600-1, 600-2 are fulfilled by the given UE 200-1-200-10 and respectively assigns the given UE 200-1-200-10 to one or more subsets 600-1, 600-2. In another example, the network node 100 creates the subsets 600-1, 600-2, e.g., based on the UEs 200-1-200-10 for which a calibration request has been previously received. In other words, in dependence of the UEs 200-1-200-10 which are requesting calibration, the network node 100 can establish one or more subsets 600-1, 600-2 on-the-fly such that various criterions are fulfilled. For example, such an approach can be desirable if it is essential that each subset includes a certain number of UEs 200-1-200-10. Of course, a combination of such techniques is possible, e.g., updating the predefined subsets 600-1, 600-2 from time to time.

As can be seen from the above, both, the criterions which are relied upon when establishing the subsets 600-1, 600-2, as well as the establishing itself can widely vary. In this light, various scenarios are conceivable for this grouping, respectively clustering of the UEs 200-1-200-10, which is typically achieved by the subsets 600-1, 600-2.

Once for a given UE 200-1-200-10 at least one subset 600-1, 600-2 has been established which includes the given UE 200-1-200-10, the network node 100 determines barometric calibration data and sends the barometric calibration data to the given UE 200-1-200-10. E.g., the processor 112 can be configured to determine the barometric calibration data. The sending of the barometric calibration data therefore constitutes a reply to the calibration request previously received from the given UE 200-1-200-10.

For example, the barometric calibration data can be determined alike for all UEs 200-1-200-10 included in a given subset 600-1, 600-2; likewise, it is possible to send the barometric calibration data to all UEs 200-1-200-10 included in the given subset 600-1, 600-2. This may have various effects: for example, computational resources required by the processor 112 to determine the barometric calibration data in such a uniform manner may be limited. Further, bandwidth needs may be comparably limited and usage of the radio link of the mobile communications network may be relieved. It is also possible that different barometric calibration data is determined for the UEs 200-1-200-10 included in a given subset 600-1, 600-2. It is also possible that the underlying techniques relied upon when determining the barometric calibration data are the same for the UEs 200-1-200-10 included in a given subset 600-1, 600-2.

Hereinafter, various details with respect to the calibration request and the barometric calibration data will be predominantly described. In general, the calibration request can take various forms and, likewise, various scenarios exist to determine the barometric calibration data. Typically, the content of the barometric calibration data depends on the content of the calibration request. For example, the calibration request can comprise sensor type information of the barometric pressure sensor 214 of a given UE 200-1-200-10, i.e., specify the particular type of the barometric pressure sensor 214; the barometric calibration data can include barometric pressure sensor error compensation data which, e.g., can be suited to reduce measurement errors for the particular sensor type of the barometric pressure sensor 214 as specified by the sensor type information. In this scenario, the subset 600-1, 600-2 can be established with respect to UEs 200-1-200-10 having corresponding sensor type information.

Figure 7:
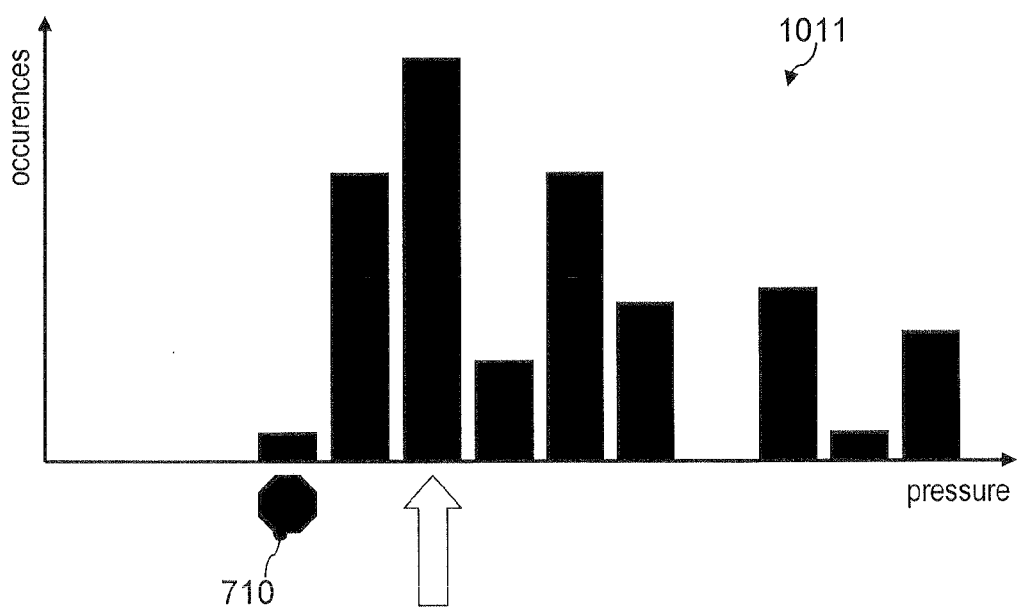
FIG. 7 illustrates a distribution of barometric pressure values measured by various UEs included in a subset.

Another scenario is that the calibration request of a given UE 200-1-200-10 comprises a barometric pressure value measured by the barometric pressure sensor 214 of the given UE 200-1-200-10. Such a scenario is illustrated in FIG. 7. In FIG. 7, a histogram of the barometric pressure values 1011 received for UEs 200-1-200-10 of a subset 600-1, 600-2 as part of the calibration request is illustrated. Further, a meteorological barometric pressure value 710, e.g., as obtained from a weather data provider, is illustrated. In the scenario of FIG. 7 the corresponding subset 600-1, 600-2 is established such that UEs 200-1-200-10 are included which are located within a predefined proximity with respect to each other. Based on the statistics of the distribution of barometric pressure values 1011 of the UEs 200-1-200-10 included in the subset 600-1, 600-2, it is possible to determine a reference barometric pressure which is included in the barometric calibration data. When determining the barometric calibration data, it is also possible to additionally or alternatively rely on the meteorological barometric pressure value 710.

In general, the determining of the barometric calibration data can be dependent on the barometric pressure values 1011 received from the UEs 200-1-200-10 included in the respective subset 600-1, 600-2. Specifically, the barometric calibration data can be determined based on a most often occurring value or value range of the barometric pressure values 1011 (indicated by the vertical arrow in FIG. 7). E.g., this most often occurring value or value range can be used as the reference barometric pressure value which is sent to the UEs 200-1-200-10. Based on this reference barometric pressure value, the UEs 200-1-200-10 can determine their altitude by employing Eq. 1.

In the scenario of FIG. 7, the most often occurring value or value range is used to determine the barometric calibration data. In general, it may be possible to analyse the received barometric pressure values 1011 in various ways when determining the barometric calibration data. For example, the barometric calibration data can be determined based on elements selected from the group comprising: a median; an average; a percentile; a most often occurring value or value range; a least often occurring value or value range; a maximum; and a minimum of the received barometric pressure values 1011. For example, for different subsets 600-1, 600-2 different techniques of analysis may be employed, e.g., depending on the terrain shape, altitude variation, and/or criterions of establishing the respective subset 600-1, 600-2, etc.

By determining the barometric calibration data based on the received barometric pressure values 1011, the effect of a simple and fail-safe, yet accurate barometric calibration may be achieved. For example, it may be possible to solely rely on the set of data obtained from the UEs 200-1-200-10 connected to the mobile communication network; it particular, it may be expendable to rely on external data sources such as the meteorological barometric pressure value 710 obtained from the weather data provider. This can make the operation of such a system more reliable. Further, the accuracy of the barometric calibration data may be higher as the defining of the subsets 600-1, 600-2 may provide a corresponding high resolution. Further, if a significant number of UEs 200-1-200-10 is included in the given subset 600-1, 600-2, statistics of said analysing may be significant and meaningful due to a reasonably sized underlying data set. This can allow to very accurately determine the barometric calibration data, e.g., including the reference barometric pressure.

For example in the scenario as discussed above with respect to FIG. 7, it may be desirable to establish the subset 600-1, 600-2 with respect to a location of the UEs 200-1-200-10. This may occur in various ways. E.g., in a simple scenario, all UEs 200-1-200-10 included in a given cell of the mobile communications network 600-1, 600-2, i.e., all UEs 200-1-200-10 connected to a particular access node of the mobile communications network, may be included in a given subset 600-1, 600-2. This is because the cell typically covers a defined area such that all UEs 200-1-200-10 connected to a cell are located within a predefined proximity with respect to each other. If the network node 100 takes the form of an access node, the respective UEs 200-1-200-10 can be the UEs connected to its cell. It is also possible that the network node 100 obtains a location of the UEs 200-1-200-10 and bases the establishing of the subsets 600-1, 600-2 on the obtained location. For example, the UEs 200-1-200-10 can send their location to the network node 100 as part of a status update. For example, the UE 200-1-200-10 can determine their location, e.g., based on one of GNSS and OTDOA techniques. Also, the network node 100 can obtain the location of the UEs 200-1-200-10 from a location register of the mobile communications network 100. In this light, the location can be specified at various accuracies, e.g., at a certain latitude and longitude and/or on cell-level and/or on area level. Then all UEs which are located within a distance of, e.g., 1 km or 500 m with respect to each other can be included in the same subset 600-1, 600-2. It would also possible to provide a grid of areas corresponding to various predefined subsets 600-1, 600-2 and check whether a given UE 200-1-200-10 is within a certain grid element, respectively subset 600-1, 600-2.

For example, for localization based on GNSS, different GNSSs can be used individually or in combination with each other. The mobile communications network can assist the GNSS receiver of a UE 200-1-200-10 by providing assistance data, e.g., a visible satellite list, clock corrections, reference positions. This may reduce the GNSS start-up and acquisition times, increase the sensitivity, and allow the UE 200-1-200-10 to consume less handset power than with stand-alone GNSS. These so-called network-assisted GNSS methods rely on signalling between UE GNSS receivers and a continuously operating GNSS reference receiver network which has clear sky visibility of the same GNSS constellation as the assisted UE.

A further technique for localization, which may be employed in the present context, is the so-called enhanced cell identification positioning method. It uses information about the serving cell and the knowledge of the location of the serving access node for estimating the location of the UE 200-1-200-10. Additional radio resource measurements like the Reference Signal Received Power (RSRP) or the Reference Signal Received Quality (RSRQ) can be used to improve the location estimate of the UE 200-1-200-10. Also timing advance and angle of arrival estimated proprietary in the base station can be considered for E-CID. Timing advance is often needed in order to time align the UE communication uplinks, but can also be used to calculate an estimate of the distance between the UE and serving base station. The angle of arrival can be estimated in the base station as the incident angle of received signals from a UE.

It is possible that the barometric calibration data alternatively or additionally includes an altitude. For example, this altitude may correspond to a reference altitude of the corresponding subset 600-1, 600-2, e.g., the particular altitude which is associated with the most often occurring pressure value in FIG. 7. E.g., the reference altitude may be predefined. It may correspond to the altitude of an access node or it may correspond to a most often occurring altitude value of a given area corresponding to a subset 600-1, 600-2. It is also possible that the network node 100 is configured to determine the altitude of a given UE 200-1-200-10 based on the received calibration request and based on the determined barometric calibration data; then it is possible to send the determined altitude of the given UE 200-1-200-10 as part of the barometric calibration data. This may have the effect that the processor 212 of the UEs may not be additionally burdened by determining the altitude, e.g., based on Eq. 1.

These techniques are illustrated based on the following, non-limiting example: Consider a subset 600-1, 600-2 defined with respect to a flat area where high-rise building are present. Typically, a situation will be encountered where most UEs 200-1-200-10 included in the subset 600-1, 600-2 are positioned on ground-level elevation and a smaller number of UEs 200-1-200-10 included in the subset 600-1, 600-2 is positioned above ground level elevation in upper floors of the high-rise buildings. Then, the distribution of barometric pressure values 1011 as illustrated in FIG. 7 may result. The most often occurring value of barometric pressure values 1011 then typically corresponds to the ground level elevation, which is measured by the majority of UEs 200-1-200-10. The corresponding altitude, which can be predefined and stored in the memory 113, can be provided together with the reference pressure to the UEs 200-1-200-10 included in the subset 600-1, 600-2. The UEs 200-1-200-10 can then determine their elevation with respect to the reference altitude based on the difference of the measured barometric pressure value 1011 to the reference barometric pressure value. This allows to determine the absolute altitude of each UE 200-1-200-10.

The techniques as described above with respect to FIG. 7 are based on the finding that the determining of the barometric calibration data for the UEs 200-1-200-10 in dependence of the measured barometric pressure values 1011 of the UEs 200-1-200-10 themselves may be comparably accurate. This is because the distribution of the histogram of the barometric pressure values 1011 may accurately resemble the distribution of altitudes within the area covered by the corresponding subset 600-1, 600-2. In the situation explained above, it was assumed that the area covered by the respective subset 600-1, 600-2 was itself flat, i.e., did not exhibit a significant altitude variation, and only a limited number of UEs 200-1-200-10 were assumed to be positioned at an elevation with respect to the reference altitude. Then it is possible to link the reference altitude with the correspondingly defined reference pressure at a large confidence level. In this light it may be desirable to establish the subset 600-1, 600-2 such that the predefined proximity within which the UEs 200-1-200-10 included in the subset 600-1, 600-2 are located does not exhibit significant altitude variations. This may be possible by establishing the subset 600-1, 600-2 to cover only a comparably small area.

More complex situations may arise where the area covered by a subset 600-1, 600-2 shows a considerable altitude variation. For example, this may result in a situation where the barometric pressure values 1011 do not show a pronounced peak, e.g., do not exhibit a clear most often occurring value as shown in FIG. 7.

In general, it may be difficult to link the reference pressure with a reference altitude based on the measured barometric pressure values 1011. Hereinafter, various techniques as will be explained in further detail which address this issue; such techniques can take into account an altitude value of the UEs 200-1-200-10 included in the respective subset 600-1, 600-2. For example, the calibration request can comprise an altitude value of the respective UE 200-1-200-10. The determining of the calibration data can be dependent on the altitude value of the UEs 200-1-200-10. It is then possible to compensate the barometric pressure values 1011 in dependence of the altitude values, e.g., by employing Eq. 1 to offset compensate each barometric pressure value 1011 with respect to a reference altitude. This may result in shifting various barometric pressure values 1011 to lower or higher values, in dependence of the corresponding altitude values. Then a more specific distribution of pressure values 1011 may result, e.g., showing a clear most often occurring value.

For example, the UEs 200-1-200-10 can be configured to determine the altitude value. The determining of the altitude value can be based on techniques such as: GNSS, OTDOA, cell identification positioning technique, barometric pressure measurements. Such techniques may have comparably large error margins, i.e., may be associated with a comparably large uncertainty. For example, GNSS and OTDOA may inherently provide the altitude at a comparably low accuracy. E.g., error margins may amount to several tenths of meters. Likewise, as discussed with respect to FIG. 4 above, the determining of the altitude based on barometric pressure measurements may be subject to a drift in time due to, e.g., changing weather conditions. Therefore, for longer (shorter) time periods since the last calibration of the barometric pressure measurements, larger (smaller) error margins in the determining of the altitude result (cf. FIG. 5).

Figure 8:
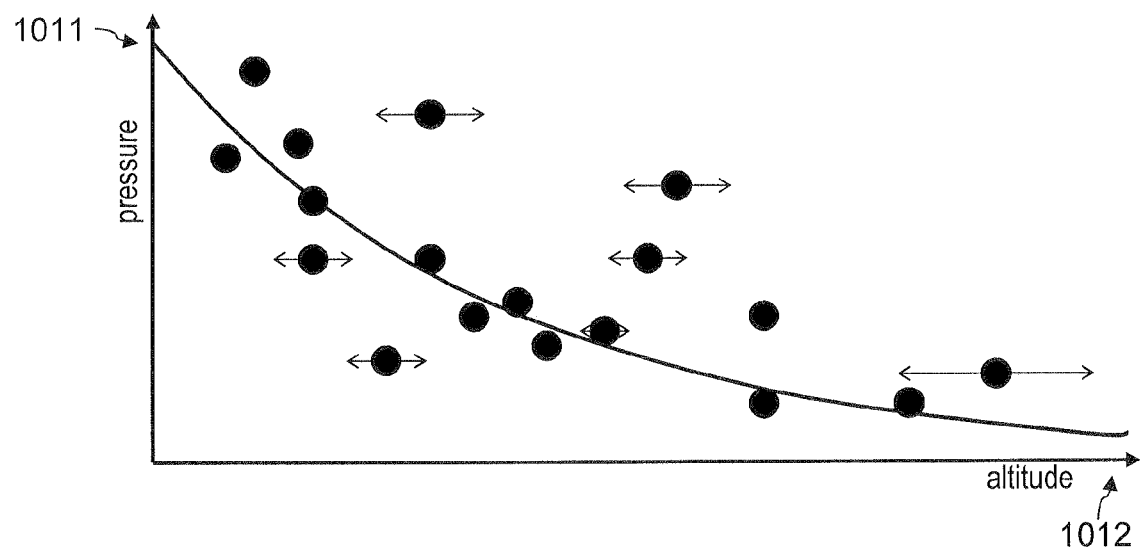
FIG. 8 illustrates a distribution of barometric pressure values measured by various UEs included in a subset and a dependency on altitude.

The calibration request of a given UE 200-1-200-10 can include an altitude confidence value, i.e., the error margins. The determining of the barometric calibration data can be dependent on the altitude confidence values of the UEs 200-1-200-10 included in the respective subset 600-1, 600-2. Such a situation is shown in FIG. 8, where the barometric pressure values 1011 are plotted over the altitude values 1012. E.g., the altitude values shown in FIG. 8 can correspond to the altitude values encountered in a subset 600-1, 600-2 which shows a significant altitude variation. Error margins are indicated in FIG. 8 for some of the altitude values 1012. For example, in a simple scenario, it may be possible to disregard such barometric pressure values 1011 and altitude values 1012 which have corresponding altitude confidence values which are larger than a threshold. In a more complex scenario, such barometric pressure values 1011 and altitude values 1012 which have smaller (larger) corresponding altitude confidence values may be considered to a smaller (larger) degree, i.e., by using smaller (larger) weights when determining the barometric calibration data based on an analysis of the barometric pressure values 1011.

By such techniques, the effect of a comparably accurate calibration of altitude may be achieved, even when the UEs 200-1-200-10 included in a subset 600-1, 600-2 are located on terrain with significant altitude variation.

In the scenarios discussed above, there may be a significant barometric pressure variation and/or a significant altitude variation present for the UEs 200-1-200-10 included in a given subset 600-1, 600-2. Scenarios are conceivable where neither a significant altitude variation, nor a significant pressure variation is present across a given subset 600-1, 600-2. This will be discussed below with respect to FIG. 9.

Figure 9:
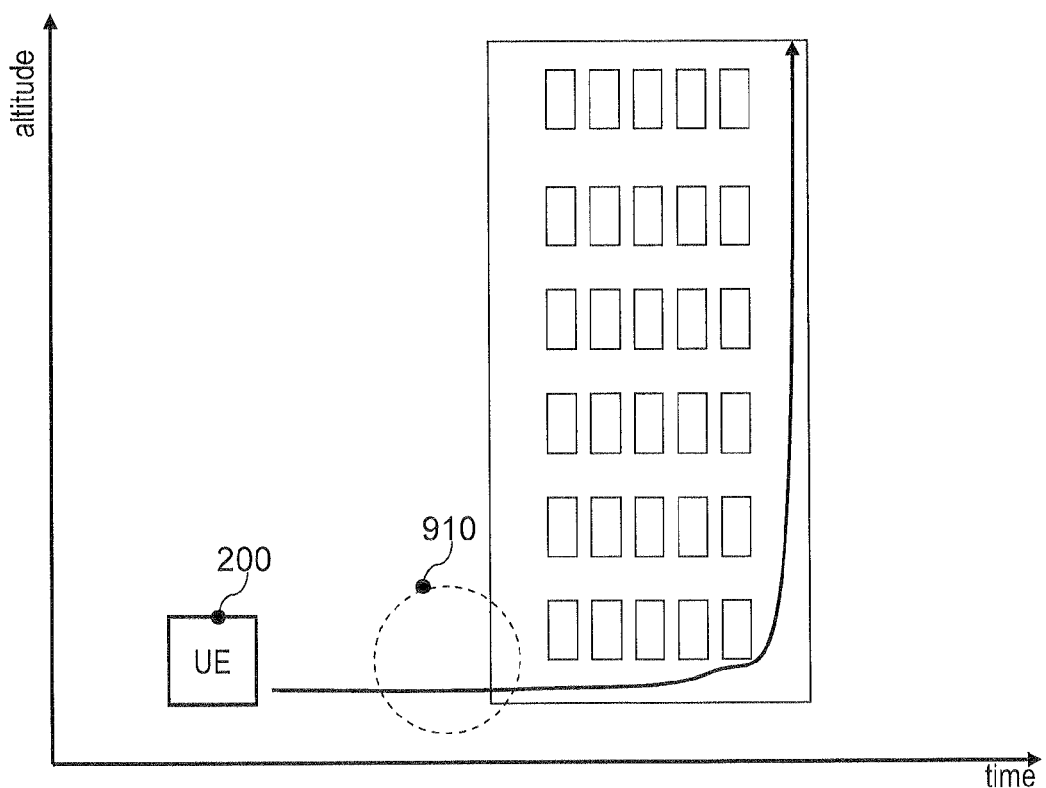
FIG. 9 illustrates floor-level navigation.

In FIG. 9, a scenario is shown where a UE 200 changes altitude over time due to moving up in a high-rise building. At the entry of the high-rise building, an access node 910 of the mobile communications network establishes a connection with the UE 200. In FIG. 9, the access node 910 is illustrated by the extents of the corresponding cell. As can be seen from FIG. 9, the extents of the cell of the access node 910 are comparably limited, e.g., amount to several tenths of meters or less. Upon establishing of a connection between the UE 200 and the access node 910, the access node 910 automatically sends barometric calibration data to the UE 200 which, e.g., includes a reference altitude. The UE 200 can use this barometric calibration data to calibrate the altitude determination. This makes it possible that to comparably accurately determine the altitude within the high-rise building, e.g., on a floor-level basis.

This technique is based on the finding that for access nodes having a cell of comparably limited extents, e.g., a pico cell of a so-called Heterogeneous Network or a Wireless Local Area Network access point, it is possible to directly provide the reference altitude as within the cell neither a significant altitude variation nor a significant pressure variation is present.

Likewise, it would be possible that the barometric calibration data is provided as an a visual tag at the entry to the high-rise building in a machine-readable form, e.g., as a Quick Response Code or the like. Then, when entering the high-rise building it would be possible to scan the code and thereby receive the barometric calibration data. Similar techniques may be employed by using radio tags.

In general, such techniques may have the effect that a comparably accurate and fast calibration is obtained. It could be possible to transmit the reference altitude and/or the reference barometric pressure as part of the handshake between the access node 910 and the UE 200, i.e., when the UE signs onto the access node 910. This may also reduce workload imposed on the mobile communications network.

Figure 10:
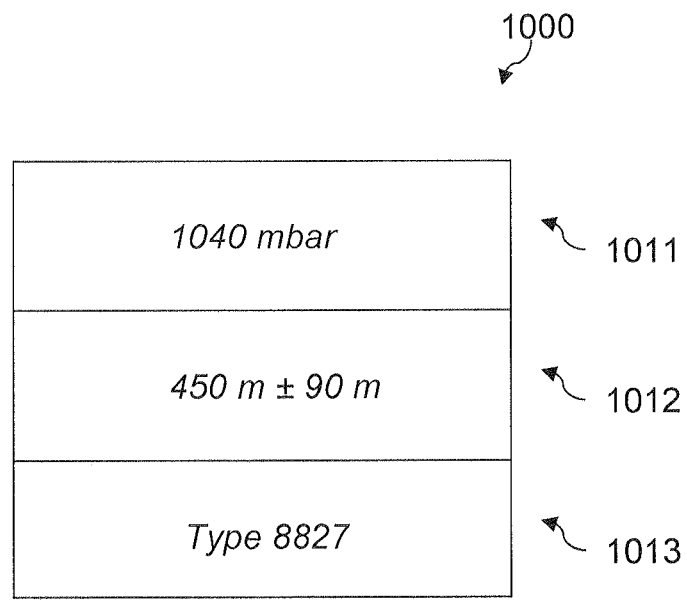
FIG. 10 schematically illustrates a calibration request according to various embodiments.

In FIG. 10, an embodiment of the calibration request 1000 is illustrated. The calibration request 1000 includes a barometric pressure value 1011, an altitude value 1012 along with a corresponding confidence value, and sensor type information 1013. The sensor type information 1013 specifies the particular type of the barometric pressure sensor 214, e.g., in a parameterized form. In this regard, it is possible that look-up tables are provided in the memories 113, 213 to encode and decode the calibration request 1000.

In general, not all of the data 1011, 1012, 1013 needs to be included in the calibration request 1000. It is possible, e.g., that the calibration request only includes the sensor type information 1013 or the barometric pressure value 1011. It is possible that the calibration request 1000 is of even simpler design; e.g., the calibration request can be implicit and be implemented by the UE 200-1-200-10 connecting with the mobile communication network and/or the UE 200-1-200-10 sending a location report and/or the UE 200-1-200-10 connecting a certain access node, or the like. Furthermore, in general the calibration request 1000 can comprise more than a single message which is sent from the UE 200 to the network node 200. E.g., the calibration request 1000 can comprise, a single, two, three, or even more messages.

Figure 11:
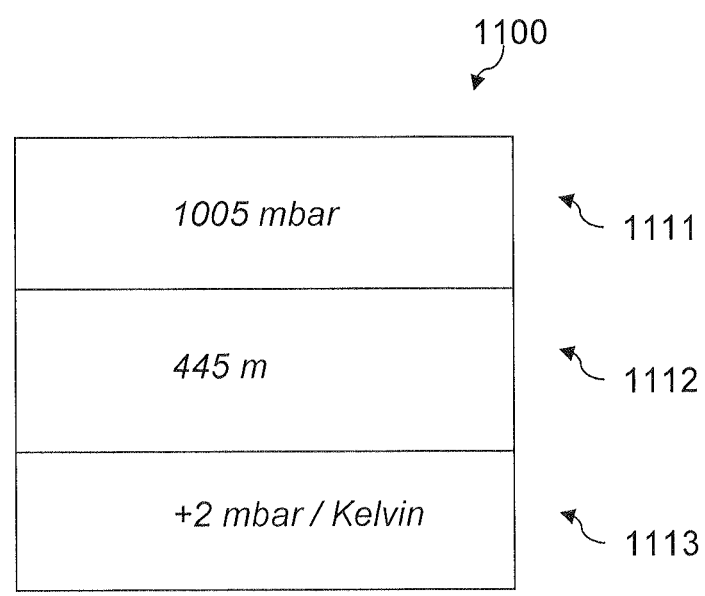
FIG. 11 schematically illustrates a barometric calibration data according to various embodiments.

Similar techniques as mentioned above with respect to the calibration request 1000 can be applied to the barometric calibration data. In FIG. 11, the barometric calibration data 1100 is illustrated. The barometric calibration data 1100 includes a reference pressure 1111, an altitude 1112, and a barometric pressure sensor compensation data 1113. In the scenario of FIG. 11, the barometric pressure sensor compensation data 1113 corresponds to a temperature compensation. In general, other types of barometric pressure sensor compensation data 1113 may be included in the barometric calibration data 1100. In general, not all of the data 1111, 1112, 1113 needs to be included in the calibration request 1100.

For example, it is possible that the barometric calibration data 1100 employs data formats corresponding to the so-called Q-codes, a standardized three-letter coding for certain barometric information. Reference is made particularly to the QNH, i.e., barometric pressure at mean sea level, and QFE codes, i.e., barometric pressure at ground level.

Figure 12:
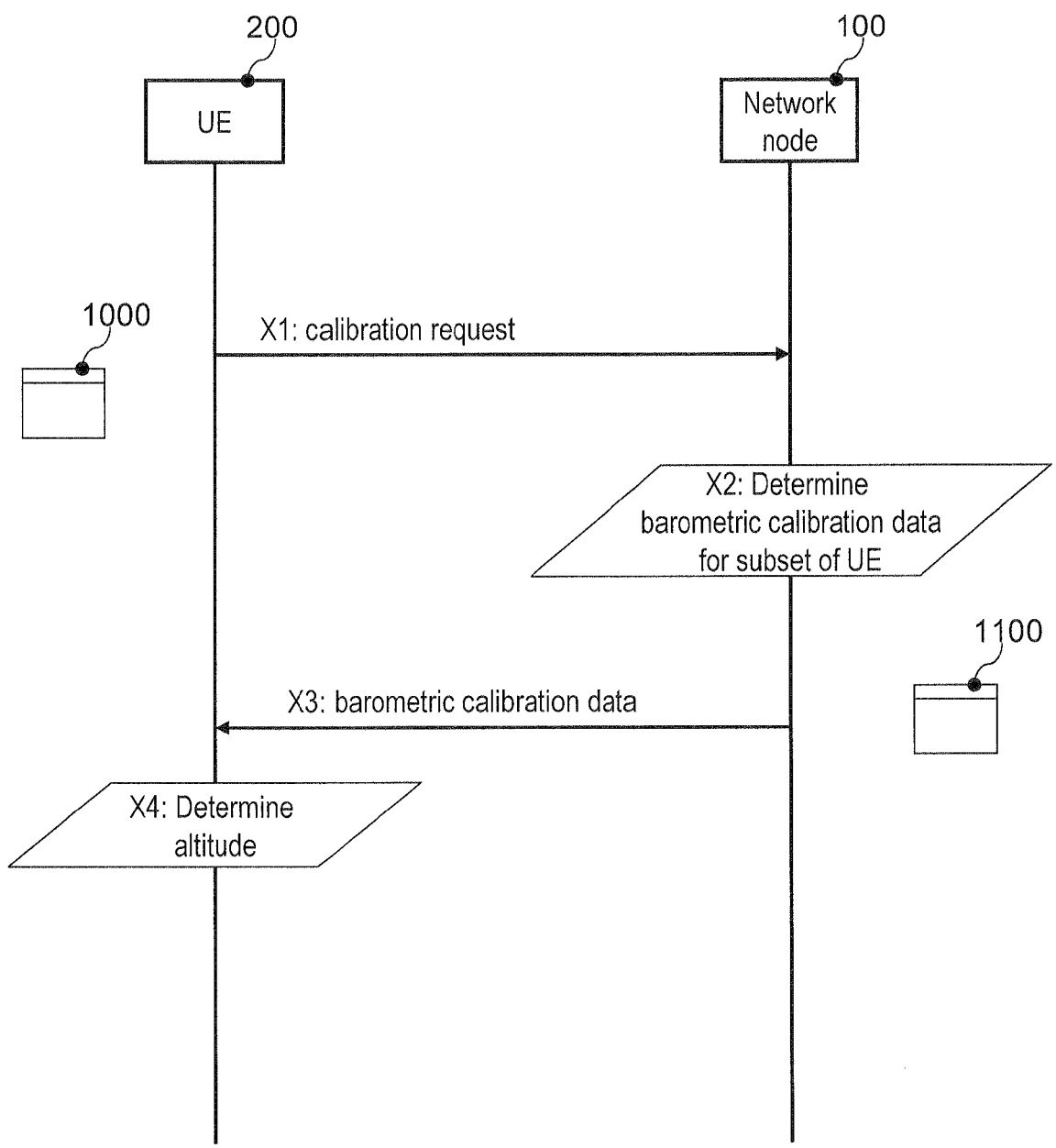
FIG. 12 is a signalling diagram for data communication between the network node and a UE according to various embodiments.

In FIG. 12, a signalling diagram between the UE 200 and the network node 100 is depicted. In step X1 the UE 200 sends the calibration request 1000 (cf. FIG. 10). The calibration request can either be an explicit request message or an implicit request, e.g., as part of a connection establishment procedure. Next, in step X2 the network node 100 determines the barometric calibration data 1100 for the one or more subsets 200-1-200-10 which include the UE 200. The barometric calibration data 1100 can include the reference barometric pressure 1111 and/or the barometric pressure sensor error compensation data 1113. This barometric calibration data 1100 is sent in step X3 to the UE 200 which determines its altitude based on the received barometric calibration data 1100 (step X4). E.g., the UE 200 can employ the Eq. 1 in step X4.

Figure 13:
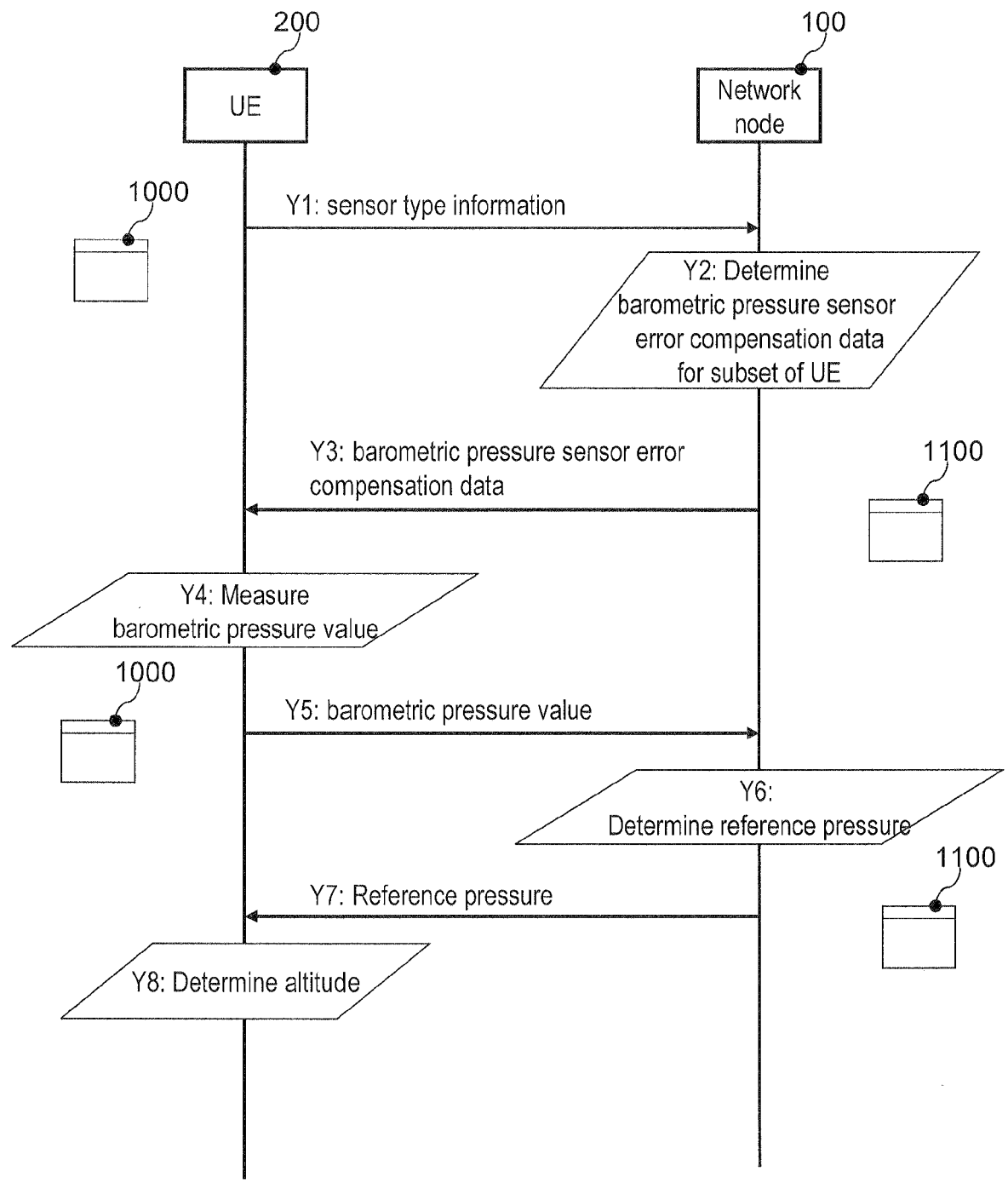
FIG. 13 is a signalling diagram for data communication between the network node and a UE according to various embodiments.

In FIG. 13, a further signalling diagram between the UE 200 and the network node 100 is depicted. In step Y1, the UE 200 sends the calibration request 1000 (cf. FIG. 10). The calibration request can either be an explicit request message or an implicit request, e.g., as part of a connection establishment procedure. In the scenario of FIG. 13, the calibration request 1000 includes the barometric sensor type information 1013. Next, in step Y2 the network node 100 determines the barometric pressure sensor error compensation data 1113 for the subset 600-1, 600-2 in which the UE 200 is included and, in step Y3, sends a first part of the barometric calibration data 1100. This first part of the barometric calibration data 1100 includes the determined barometric pressure sensor error compensation data 1113. It is possible that, with respect to steps Y2 and Y3, the subset 600-1, 600-2 in which the UE 200 is included is established with respect to all included UEs being of the same type.

E.g., the barometric sensor type information 1013 can comprise relations between a UE device identifier and the sensor type identifier. It may also comprise more detailed barometric pressure sensor type characteristics. Such relations can be stored in the network node 100, retrieved from another network node of the mobile communications network, or retrieved from the UE 200 (not shown in FIG. 13).

The determining of the barometric pressure sensor error compensation data 1113 in step Y2 can be based on characteristics of the pressure sensor 214 of the UE 200 or can be based on measurements from further UEs with known altitudes and barometric pressures values, e.g., having the same type of barometric pressure sensor 214 than the UE 200. The offset can also be determined based on temperature and other weather information.

In step Y4, the UE 200 measures the barometric pressure value employing the barometric pressure sensor 214 and based on the received barometric pressure sensor error compensation data 1113. The measuring based on the received barometric pressure sensor error compensation data 1113 can optionally include: adjusting a measured barometric pressure sensor value based on the received based on the received barometric pressure sensor error compensation data 1113, e.g., to compensate for a temperature offset, a measurement bias, or the like. In this light, measuring may not be restricted to the step of reading out the barometric pressure sensor 214, i.e. the acquiring of data, but may optionally include such post-processing steps. For example, it may be possible that the acquiring of the data is executed at a first point in time and the measurement is completed by said adjusting based on the barometric pressure sensor error compensation data 1113 at a second point in time. E.g., the second point in time may be delayed if compared to the first point in time. E.g., the barometric pressure sensor error compensation data 1113 may be received between the first and second points in time.

In step Y5, the measured barometric pressure value 1011 is sent to the network node 100 as a second calibration request 1000. The network node determines the reference barometric pressure (step Y6) and sends a second part of the barometric calibration data 1100 in step Y7. In the scenario of FIG. 13, the second part of the barometric calibration data 1100 includes the reference barometric pressure. In this light, the subset 600-1, 600-2 in which the UE 200 is included with respect to steps Y6 and Y7 may be defined such that UEs are included which are located within a certain proximity with respect to each other. As can be seen, the subset assignment with respect to various types of barometric calibration data 1100 may change, i.e., in FIG. 13 between steps Y2 and Y6.

In step Y8, the UE 200 determines its altitude. For example, it would be possible the second part of the barometric calibration data 1100 sent in step Y7 already includes the altitude of the UE 200. Then the UE 200 may readily use this received altitude as its altitude in step Y8.

Figure 14:
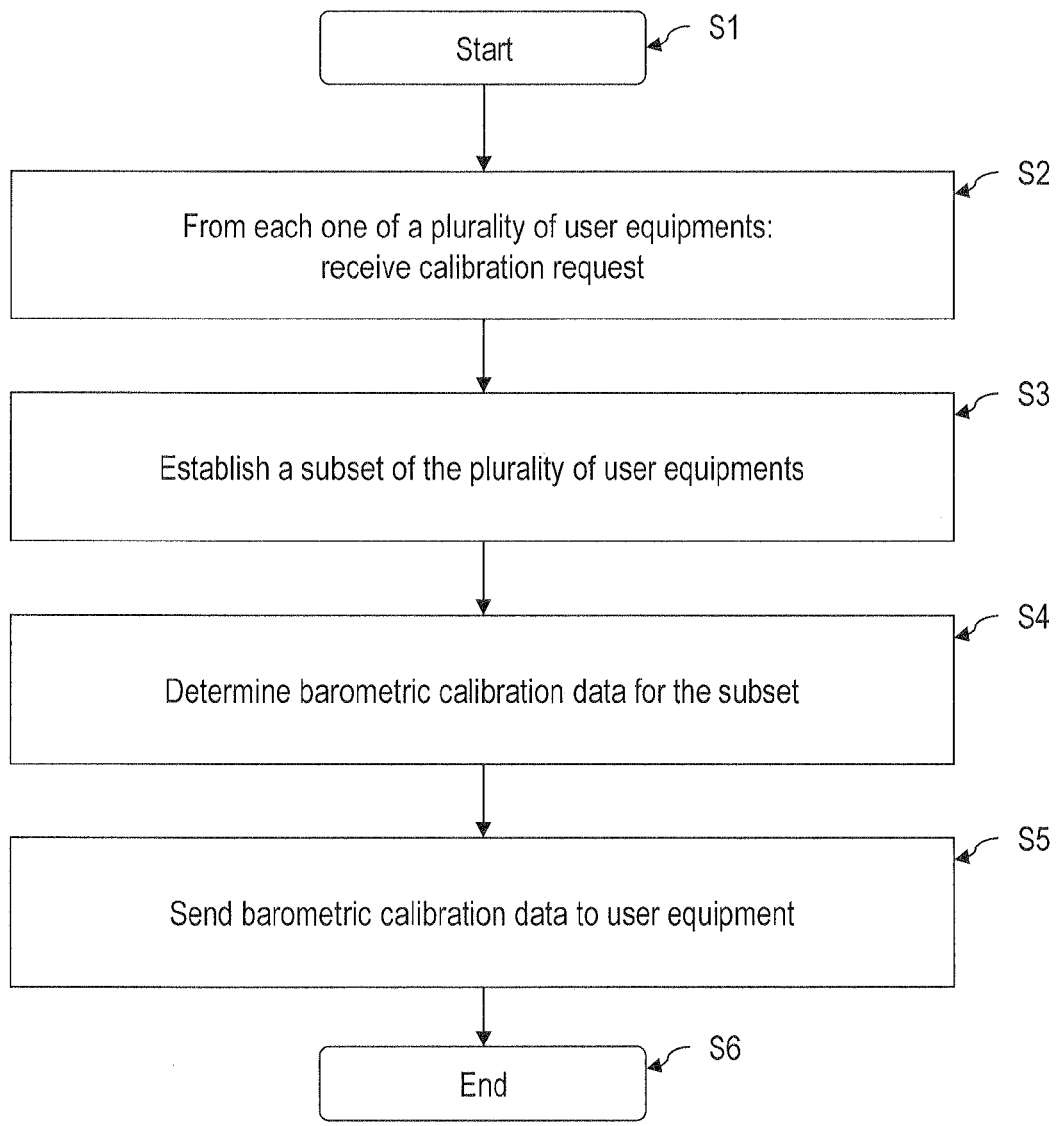
FIG. 14 is a flowchart of a method of providing barometric calibration data according to various embodiments.

In FIG. 14, a flowchart of a method of providing barometric calibration data is illustrated. The method starts in step S1. In step S2, the network node 100 receives from each one of a plurality of UEs 200-1-200-10 the calibration request 1000. Based on the received calibration requests 1000, the network node 100 establishes a subset 600-1, 600-2 of the plurality of UEs 200-1-200-10. Here, establishing can correspond to newly defining the subsets 600-1, 600-2 and/or accessing predefined subsets 600-1, 600-2 and assigning the UEs 200-1-200-10 to the predefined subsets 600-1, 600-2. In step S4, the barometric calibration data 1100 is determined for the subset 600-1, 600-2. The barometric calibration data 1100 is sent to the UEs 200-1-200-10 included in the subset 600-1, 600-2. E.g., the barometric calibration data 1100 can be the same for all UEs 200-1-200-10 included in the subset 600-1, 600-2, e.g., if it comprises barometric pressure sensor error compensation data 1113 and/or the reference barometric pressure 1111. The barometric calibration data 1110 may, however, be different for each UE 200-1-200-10 included in the subset 600-1, 600-2, e.g., if it includes the altitude 1112 of a respective UE 200-1-200-10. The method ends in step S6.

Figure 15:
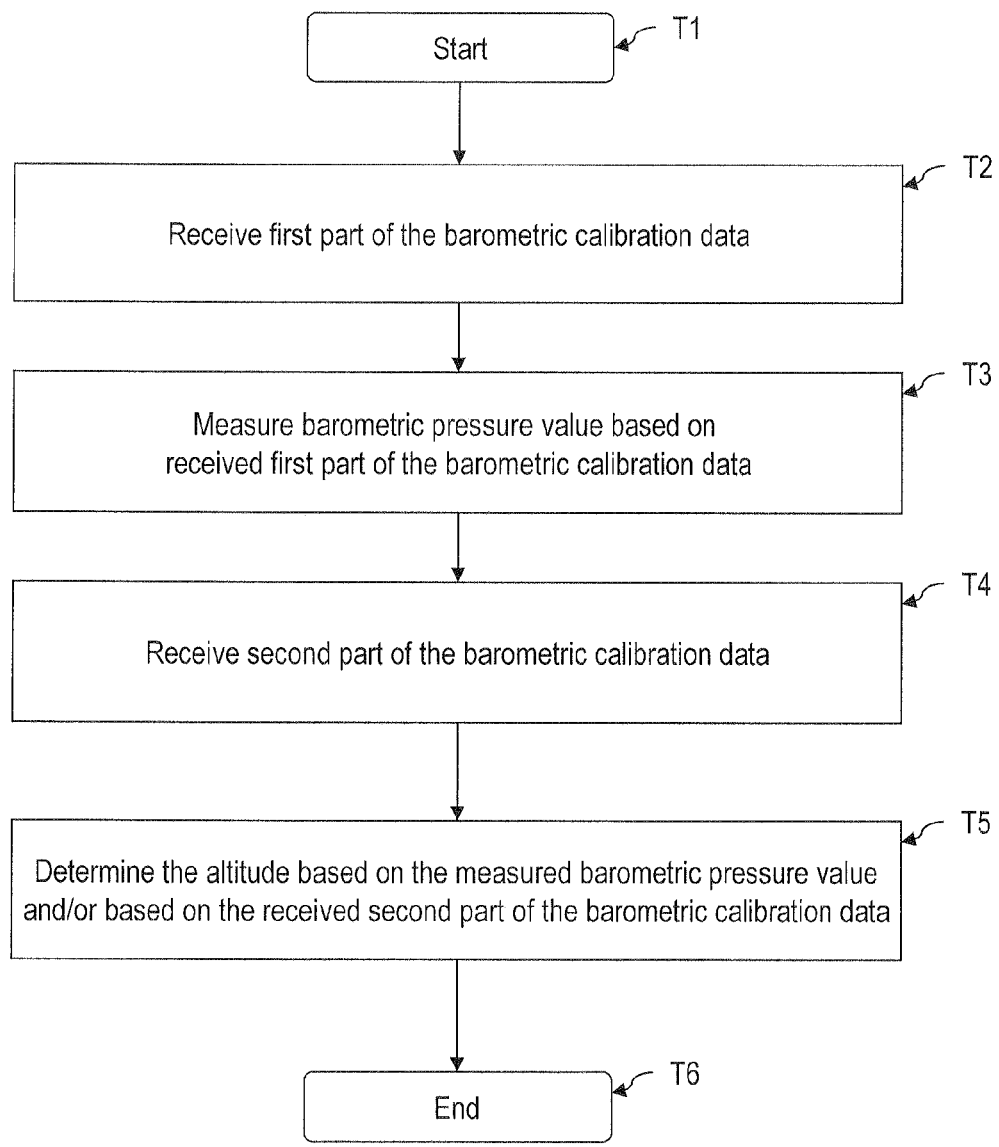
FIG. 15 is a flowchart of a method of determining an altitude according to various embodiments.

In FIG. 15, a flowchart of a method of determining an altitude is illustrated. The method starts in step T1. In step T2, the UE 200 receives a first part of the barometric calibration data 1100, e.g., comprising the barometric pressure sensor error compensation data 1113. Based on this received first part of the barometric calibration data 1100, the UE 200 measures the barometric pressure value 1011. In step T4, the UE 200 receives a second part of the barometric calibration data 1100, e.g., including the reference barometric pressure 1112 and/or the altitude 1112. In step T5, the UE 200 determines the altitude based on the received second part of the barometric calibration data 1100 and optionally based on the measured barometric pressure value 1011.

For example, it is possible that the UE 200 sends the measured barometric pressure value 1011 to the network node 100 (not shown in FIG. 15), e.g., after executing step T3 and as part of the calibration request 1000. Likewise, it is possible that the UE 200 sends the barometric pressure sensor type information 1013 to the network node 100 (not shown in FIG. 15), e.g., before executing step T2 and as part of the calibration request 1000. Further, it is possible that after step T5 the UE 200 sends a report, e.g., including the determined altitude. The report can be sent to the network node 100 or another network entity. In general, the network node 100 can pro-actively provide the first and second calibration data 1100 such that there is no need to send the calibration requests 1000.

The method ends in step T6.

For example, the techniques illustrated in FIGS. 14 and 15 can be re-executed from time to time, e.g., with a fixed repetition rate or in dependence of resources available on the respective radio links of the mobile communications network. In general, it may be desirable to provide barometric calibration on a time-scale on which the detuning of the altitude due to changing weather is typically occurring (cf. FIGS. 5 and 6). With respect to FIG. 15, it is possible that the first and second parts of the barometric calibration data 1100 are sent to the UE 200 at different repetition rate. E.g., the barometric pressure sensor error compensation data 1113 (the reference pressure 1111 and altitude 1112) may be sent to the UE 200 less often (more often).

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A method of providing barometric calibration data to a given user equipment in a mobile communications network, the method comprising:

a network node receiving a respective calibration request from each one of a plurality of user equipments, the plurality of user equipments including the given user equipment, establishing at least one subset of the plurality of user equipments which includes the given user equipment based on the calibration requests, determining the barometric calibration data for the established at least one subset, and sending the barometric calibration data at least to the given user equipment.

2. The method of claim 1, wherein at least one of the calibration requests comprises a sensor type information of a barometric pressure sensor of the respective user equipment wherein said establishing of the at least one subset is dependent on the sensor type information.

3. The method of claim 2, wherein the at least one subset is established by putting in a same subset the user equipments which have corresponding sensor type information to each other, and wherein the barometric calibration data includes barometric pressure sensor error compensation data.

4. The method of claim 1, further comprising:

obtaining a location of at least one of the plurality of user equipments wherein said establishing of the at least one subset is dependent on the at least one location.

5. The method of claim 4, wherein the at least one subset is established by including the user equipments which are located within a predefined proximity with respect to each other.

6. The method of claim 1, wherein at least some of the calibration requests comprise a barometric pressure value measured by a barometric pressure sensor of the respective user equipment wherein said determining of the barometric calibration data for the established at least one subset is dependent on the barometric pressure values received from the user equipments included in the at least one subset.

7. The method of claim 6, wherein said determining of the barometric calibration data is based on a most often occurring value or value range of the barometric pressure values received from the user equipments included in the at least one subset.

8. The method of claim 1, wherein at least one of the calibration requests comprises an altitude value of the respective user equipment wherein said determining of the barometric calibration data for the established at least one subset is dependent on the at least one altitude value of the user equipment included in the at least one subset.

9. The method of claim 6, further including:

compensating the barometric pressure values in dependence of an altitude value.

10. The method of claim 8, wherein at least one of the calibration requests comprises an altitude confidence value of the respective user equipment wherein said determining of the barometric calibration data for the established at least one subset is dependent on the at least one altitude confidence value of the user equipment included in the at least one subset.

11. The method of claim 1, wherein the barometric calibration data is at least one of a reference barometric pressure, an altitude, and a barometric pressure sensor error compensation data.

12. A network node of a mobile communications network, the network node being configured to provide barometric calibration data to a given user equipment of the mobile communications network, the network node comprising:

an interface configured to receive a respective calibration request from each one of a plurality of user equipments the plurality of user equipments including the given user equipment, at least one processor configured to establish at least one subset of the plurality of user equipments which includes the given user equipment based on the calibration requests and further configured to determine the barometric calibration data for the established at least one subset, wherein the interface is further configured to send the barometric calibration data at least to the given user equipment.

13. The network node of claim 12, wherein at least one of the calibration requests comprises a sensor type information of a barometric pressure sensor of the respective user equipment, wherein the at least one processor establishes the at least one subset based on the sensor type information.

14. The network node of claim 13, wherein the at least one processor establishes the at least one subset based on putting in a same subset the user equipments which have corresponding sensor type information to each other, and wherein the barometric calibration data includes barometric pressure sensor error compensation data.

* * * * *